Aug. 8, 1933.   H. B. TOWNSLEY   1,921,331
RIM FOR TIRES
Filed Sept. 23, 1931   2 Sheets-Sheet 1
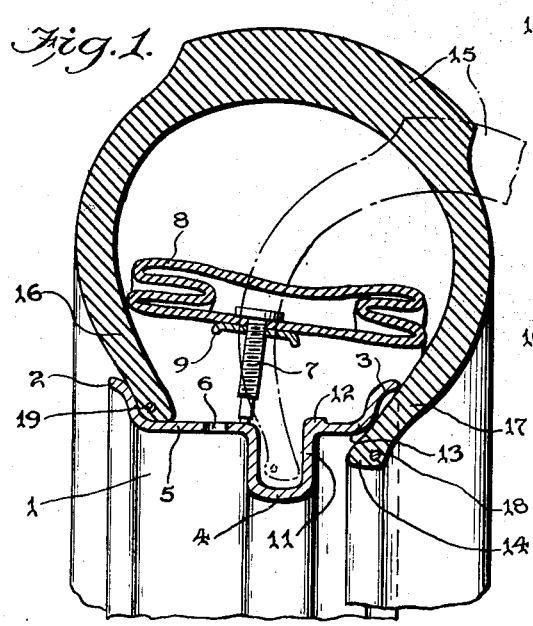
Fig.1.
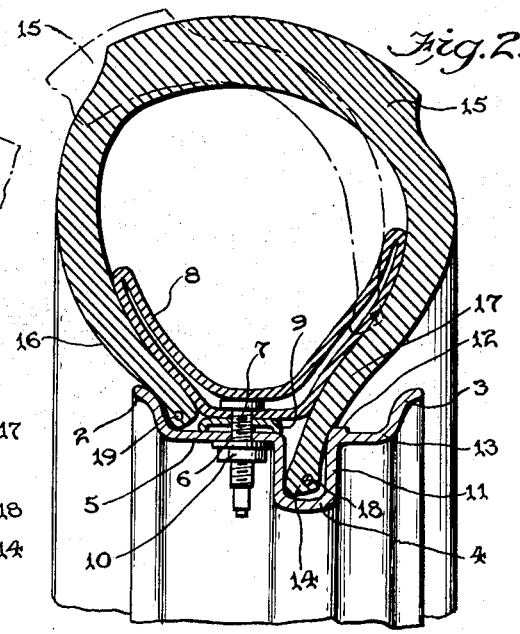
Fig.2.
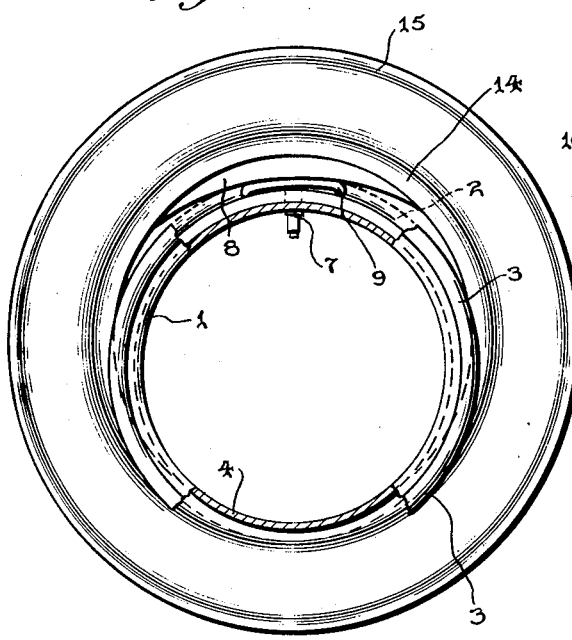
Fig.3.
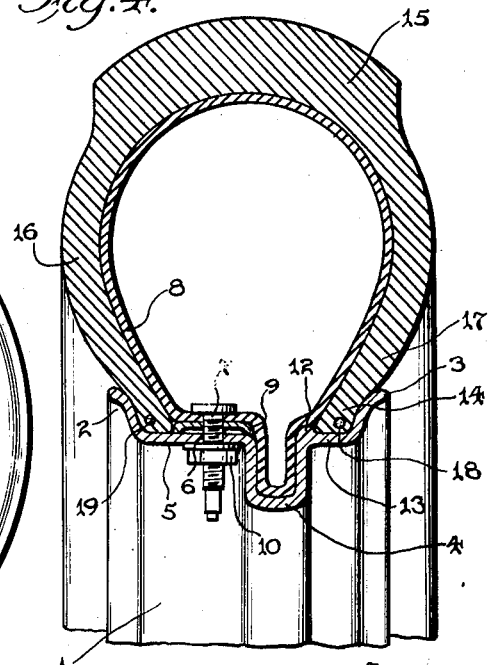
Fig.4.
Inventor
Hugh B. Townsley,
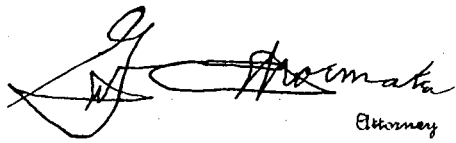
By
Attorney Aug. 8, 1933.  H. B. TOWNSLEY  1,921,331
RIM FOR TIRES
Filed Sept. 23, 1931   2 Sheets-Sheet 2
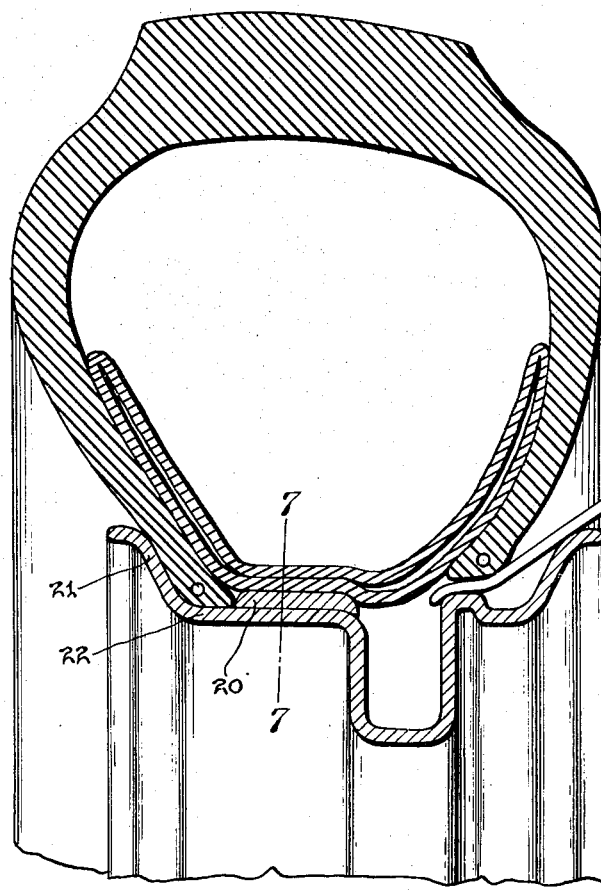
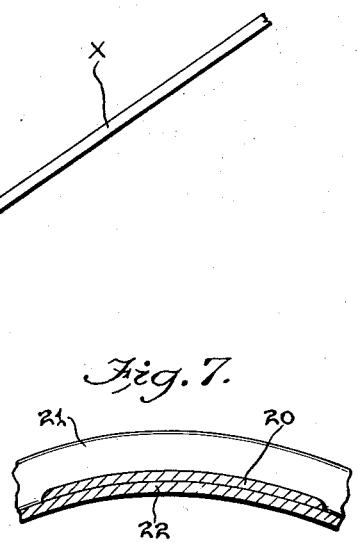
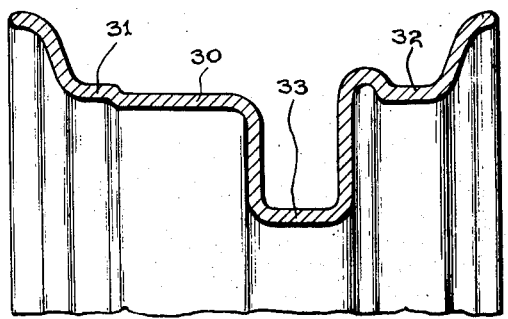
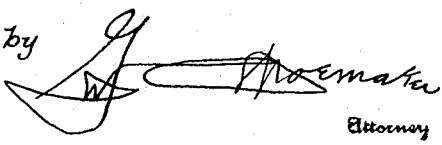
Inventor
Hugh B. Townsley,
by
Attorney Patented Aug. 8, 1933

1,921,331

UNITED STATES PATENT OFFICE 1,921,331

RIM FOR TIRES

Hugh B. Townsley, Spokane, Wash.

Application September 23, 1931
Serial No. 564,629

3 Claims. (Cl. 152—20)

This invention relates generally to a rim for tires, and more particularly to an improvement in the construction of drop side and drop center rims for pneumatic tires.

One object of the present invention is to provide a rim particularly adapted to be used with automobiles or other vehicles, embodying among other characteristics means whereby the tire may be easily and quickly mounted on the rim and readily and quickly removed therefrom when desired.

Another object of the invention is to provide a rim construction which will prevent the tire upon accidental deflation from coming off the rim.

With these and other objects in view, the invention consists in the construction and novel combination and arrangement of parts hereinafter fully described, illustrated in the accompanying drawings, and set forth in the claims hereto appended, it being understood that various changes in the form, proportion, and minor details of construction, within the scope of the claims, may be resorted to without departing from the spirit of the invention or sacrificing any of the advantages thereof.

In the accompanying drawings:

Figure 1 is a transverse sectional view of a rim constructed in accordance with the present invention and a tire having the tube deflated therein, and showing in dotted line position the first step of mounting the tire upon the rim and in full line position the second step of mounting the tire on the rim.

Fig. 2 is a transverse sectional view of the rim and a tire with the tube therein in deflated condition, and showing in full lines the third step of mounting the tire on the rim and in dotted lines the fourth step, which permits raising of the outer side wall of the tire to insert the valve stem in the opening.

Fig. 3 is a side elevation showing the outer side wall of the tire raised above the outer side flange of the rim.

Fig. 4 is a transverse sectional view showing the tire and tube in completely assembled position on the rim, with the tube inflated and the valve stem in place.

Fig. 5 is a transverse sectional view of the rim, tire and tube, showing a slightly modified form of rim.

Fig. 6 is a transverse sectional view of another modification.

Fig. 7 is a sectional view taken on the line 7—7 of Fig. 5.

Referring more particularly to the drawings, the reference character 1 indicates generally the base portion of the tire rim. The base portion of the rim is provided with oppositely disposed side flanges 2 and 3, respectively. Intermediate said side flanges and preferably adjacent side flange 3, the base portion 1 is provided with a drop portion 4 in the form of a circumferential groove, channel or well. This groove, channel, or well 4 is relatively deep and is of a width sufficient only for the reception of one bead portion of a tire at a time. In other words, both bead portions and their side wall portions of the tire could not enter the groove 4 together, as this groove is of a width to receive only one bead portion at a time.

The base portion of the rim 1, adjacent the side flange 2, consists of a relatively wide plane portion 5 which is provided with an opening 6 to receive the valve stem 7 of an inner tube 8. The valve stem is provided with a metal plate 9 adjacent its base and has the usual jam nut 10 arranged exteriorly of the rim to hold the valve stem in place after it has been inserted through the opening 6. The circumferential channel or groove 4 is preferably of substantially U-shape and adjacent and at the radially outer portion of the side wall 11 thereof, there is formed or provided a circumferentially arranged safety stop or ridge 12 which extends radially outwardly of the plane of the base portion of the rim. Intermediate of said side flange 3 and the safety ridge or stop 12 there is formed or provided because of the safety ridge or stop 12 a channel seat 13 which is adapted to receive a bead portion 14 of a conventional pneumatic tire 15 having side walls 16 and 17, respectively. Suitable re-inforcing wires 18 and 19 are disposed circumferentially in the bead portion of the tire, as is customary in the construction of pneumatic tires.

In some instances it will be advisable to mount a counterweight 20 on the base portion of the rim, as shown in Fig. 5. This counterweight is preferably mounted diametrically opposite the valve stem opening 6 and serves to balance or offset the weight of the valve stem. This counterweight, as will be seen, is spaced from the side flange 21 and forms a seat 22 and safety stop for the bead portion of the tire. It is to be understood that this counterweight may be attached to the rim by rivets, welding or in any suitable manner.

The modification shown in Fig. 6 is very similar to the invention as disclosed in Fig. 1, except that the wide portion of the rim 30 is radially inwardly of the plane of the seats 31 and 32, respectively, for the bead portions of the tire. This construction permits the bead portion and side wall of the tire to be more quickly and readily moved from the groove 33 over to and upon the seat 31, and reversely will permit ready disengagement therefrom. It will be understood that while the safety stop or ridge 12 has been shown and described as being circumferentially arranged on a plane radially outwardly of the base portion, this stop or ridge might well be in the form of lugs or projections spaced at intervals around the base portion, but of course being on a plane radially outwardly of the base portion.

It may be found in some instances desirable to have the circumferential groove or channel 4 extend only part of the way around the rim, but it is preferable to have the groove extend entirely around the rim. While the drop portion 4 of the rim and the safety ridge 12 have been shown and described as being adjacent the side flange 3, it might in some instances be desirable to reverse the parts and have the drop portion 4 and safety stop or ridge 12 adjacent the side flange 2.

To mount the tire on the rim, it is simply necessary to place the bead portion of the tire wall 16 into the groove 4, as shown in dotted lines in Fig. 1, and from this position the tire wall 16 is moved to the full line position over the straight surface of the rim, as also shown in Fig. 1. Then the tire wall 17 of the tire is worked over the side flange 3, sometimes referred to as an outboard side flange, and into the groove 4, as shown in full lines in Fig. 2. From this position, as shown in full lines in Fig. 2, the side wall 17 of the tire can be raised by the insertion of the hand under the bead portion 14 to the dotted line position as shown in Fig. 2, which permits insertion of the valve stem 7 of the inner tube through the opening 6 in the rim. After the valve stem has been inserted through the opening, the jam nut 10 is applied exteriorly of the rim. Upon removing the hand from under the bead portion of the tire, the side wall 17 will again assume the full line position as shown in Fig. 2. From this position, and due to the inflation of the inner tube, the upward and outward movement of the inner tube, equally distributed on the inside of the tire wall, allows it to leave the groove 4 and rise over the safety stop or ridge 12 into position as shown in Fig. 4.

To dismount the tire from the rim after the air has been released from the inner tube, a suitable tool X, as shown in Fig. 5, is forced under the bead 14 of the tire and then with a radially inward movement of the free end of the tool the bead portion 14 of the tire is stretched and may be lifted radially outward and at the same time over the safety stop or ridge 12 and into the drop portion or groove 4. In Fig. 5 the tool X is shown as having raised the bead portion and side wall of the tire from the channel seat over the safety stop or ridge by a radially inward and a radially outward movement of the tool and upon further movement of the tool from its position shown in Fig. 5 the bead portion and side wall of the tire will drop into the groove. Then the outboard side wall 17 of the tire can be removed over the side flange 3 in the usual manner. Then by removing the nut 10 from the valve stem, which is forced inside of the tire casing, the inside tire wall 16 is moved over into the groove 4 and then removed the same as the outboard side wall.

It will be noted that with the particular location of the valve stem 7, and upon accidental deflation or blowout of the tire, the inboard side wall 16 of the tire will be prevented from moving over into the groove 4. The outboard side wall and bead portion 14 of the tire, which is seated in the channel seat 13 and snugly received therein intermediate of the outer side flange 3 and the safety ridge 12, also positively prevents the outboard side wall and its bead portion from rising over said stop or ridge and into the groove 4 when the tire has become accidentally deflated or has blown out. The width of the groove or well 4 is sufficient only to receive one side wall and bead portion of a tire at a time.

In the usual drop center rims, the groove is of sufficient width to permit both of the bead portions and side walls of a tire to enter the groove at the same time. Therefore, it will be clear that if the tire blows out or is accidentally deflated while the car or other vehicle is in motion, both of the bead portions will enter the groove and the tire will disengage itself from the rim. It is the primary purpose of my invention to overcome this disadvantage of the usual drop center rim. By constructing a rim in accordance with my invention it will be readily seen that if the tire becomes accidentally deflated or blows out, it will be impossible for either of the side walls of the tire to enter into the groove due to the particular arrangement of the valve stem and the safety stop or ridge, and therefore if the tire does become deflated for any cause whatever when the car is in motion, the tire will positively not leave the rim. To remove the tire from a rim constructed in accordance with my invention it is absolutely necessary that the removal be accomplished manually, for the side walls and the bead portions must be individually moved into the groove and from this position only can the tire be removed over the outer side flange of the rim. The outer wall of a tire mounted on a rim constructed in accordance with the present invention, can only be forced over the safety stop or ridge by a radially outward and a radially inward movement. This movement must be done by an individual manually, and such a movement is not transmitted to the tire after it has become deflated for any cause while the car is in motion. If the tire does become deflated, there will be a tendency, due to the weight of the machine and the swaying of the car, to more forcibly hold the outer side wall of the tire in its channel seat, and the movement of the car in swaying back and forth or rounding a curve, will positively not produce a radially outward and a radially inward movement, and therefore it is impossible to force the outside wall over the safety stop or ridge except by forcible manipulation by an individual.

Reference to rims for vehicle wheels does not limit the use of my invention to automobiles, trucks and the like, but is intended by me to include rims for the wheels of toy vehicles, baby carriages, aeroplanes and all wheeled structures of whatever character.

From the foregoing it will be seen that I provide a comparatively simple, inexpense, durable and effective rim for automobiles or other vehicles, and that by virtue of the structural characteristics pointed out in detail above, the tire is not liable to become accidentally separated from the wheel in the event of accidental deflation of the tire, as has been known to be the case in many instances, resulting in many accidents, due to inability of the driver to control the steering of the vehicle when a tire has been accidentally dislodged from the wheel.

What is claimed is:

1. A rim for pneumatic tires comprising a base portion with side flanges at the marginal portions thereof, said base portion being provided with a circumferentially arranged groove, a safety stop adjacent said groove at one side of the base portion, and the other side of said base portion being relatively wide and having an opening therein to receive the valve stem of a tube, a counterweight diametrically opposite said valve stem and opening on said base portion of the rim, said counterweight serving to balance the weight of said valve stem, said safety stop, said valve stem and said counterweight serving to prevent either of the bead portions of the tire from entering said groove in the event of accidental deflation of the tire.

2. A rim for pneumatic tires, comprising a plane circumferential base portion and side flanges, said base portion being provided adjacent one of said side flanges with a relatively deep, unobstructed, circumferentially-arranged groove, said groove being of width sufficient for the reception therein of a bead portion of a tire, which groove is located nearer one side flange than the other, and means extending radially outwardly of the plane of said base portion intermediate of said groove and the side flange nearest thereto for forming a safety ridge and a channel seat on the base for one of the bead portions of a tire.

3. A metal rim for pneumatic tires, comprising a relatively wide plane circumferential base portion and side flanges, one of which flanges may be termed an outboard side flange and the other as an inboard side flange, said base portion being provided with a deep, radially-inwardly directed, unobstructed, circumferentially-arranged groove, said groove being of a width sufficient for reception therein of a bead portion of a tire and arranged nearer the outboard side flange than it is to the inboard side flange, means extending radially outwardly of the plane of said base portion adjacent said groove and intermediate of said groove and said outboard side flange and forming a safety ridge and forming a channel seat for the bead portion of the outboard wall of a tire, the space between the inboard side wall and said groove being relatively uniform and wide, the rim being provided with an opening therethrough for the reception of a valve stem.

HUGH B. TOWNSLEY.